US012793080B2

(12) United States Patent
Mathur et al.

(10) Patent No.: US 12,793,080 B2
(45) Date of Patent: Nov. 10, 2026

(54) SYSTEM AND METHOD OF EVALUATING RESPONSES PROVIDED BY LARGE LANGUAGE MODELS

(71) Applicant: Microsoft Technology Licensing, LLC, Redmond, WA (US)

(72) Inventors: Kartik Mathur, Seattle, WA (US); Andrew David Myers, Seattle, WA (US); Yinyu Jin Quan, Fullerton, CA (US); Dalia Ahmed Essa Swellum, Snohomish, WA (US); Fa Qiang Tang, Bellevue, WA (US); Justin Jack Traenkenschuh, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 737 days.

(21) Appl. No.: 18/330,446

(22) Filed: Jun. 7, 2023

(65) Prior Publication Data

US 2024/0412226 A1 Dec. 12, 2024

(51) Int. Cl.
*G06Q 30/016* (2023.01)
*G06F 9/451* (2018.01)

(52) U.S. Cl.
CPC ........... *G06Q 30/016* (2013.01); *G06F 9/453* (2018.02)

(58) Field of Classification Search
CPC .......... G06F 40/30; G06F 9/453; G06F 40/35; G06F 16/3344; G06F 16/3329;
(Continued)

(56) References Cited

U.S. PATENT DOCUMENTS 7,702,508 B2 * 4/2010 Bennett ............. G06F 16/24522 704/270.1
11,442,992 B1 * 9/2022 Moon ............... G06F 16/90332
(Continued)

OTHER PUBLICATIONS

Md Tahmid Rahman Laskar et al. 2020. Contextualized Embeddings based Transformer Encoder for Sentence Similarity Modeling in Answer Selection Task. In Proceedings of the Twelfth Language Resources and Evaluation Conference, pp. 5505-5514, Marseille, France. European Language Resources Association. (Year: 2020).*
(Continued)

*Primary Examiner* — Richemond Dorvil
*Assistant Examiner* — Rodrigo A Chavez
(74) *Attorney, Agent, or Firm* — Han Gim; Newport IP, LLC

(57) ABSTRACT

A system and method for evaluating performance of a model used in providing a response to a product help inquiry includes receiving the product help inquiry, classifying the product help inquiry as being associated with a topic related to a product, and retrieving a path of actions provided in a help documentation associated with the topic. A prompt is also generated based on the product help inquiry for transmission to the model and a response is provided by the model, before a path of actions included the response is extracted. Contextual embeddings for the extracted path are generated and semantic similarities between contextual embeddings for the extracted path and embeddings generated for an expected response are measured. By generating contextual embeddings for the extracted path instead of the entire response, resources required for evaluating the response are significantly reduced. A path coverage metric is measured for the extracted path. A total evaluation value for the response is determined based on a weighted combination of one or more of the measured semantic similarity, path
(Continued)

coverage metric, a path length metric or a path frequency metric.

16 Claims, 9 Drawing Sheets

(58) Field of Classification Search
CPC .... G06F 16/243; G06F 16/334; G06F 16/632; G06Q 30/016; G10L 15/1822; G10L 15/22; G10L 15/1815
USPC .......................................................... 704/9
See application file for complete search history.

(56) References Cited

U.S. PATENT DOCUMENTS

| | | | | |
|---|---|---|---|---|
| 11,816,573 | B1 * | 11/2023 | Garvey | G06F 16/345 |
| 12,007,988 | B2 * | 6/2024 | Nallapati | G06N 20/00 |
| 12,657,186 | B1 * | 6/2026 | Nagarajan | G06F 16/24522 |
| 2019/0251165 | A1 * | 8/2019 | Bachrach | G06N 5/02 |
| 2021/0141798 | A1 * | 5/2021 | Steedman Henderson | G06N 3/045 |
| 2021/0240776 | A1 * | 8/2021 | Jawagal | G06N 3/049 |
| 2022/0141160 | A1 * | 5/2022 | Ham | H04L 51/02<br>709/206 |
| 2022/0292262 | A1 * | 9/2022 | Japa | G06N 3/09 |
| 2022/0414137 | A1 * | 12/2022 | Sewak | G06F 16/3346 |
| 2023/0135179 | A1 * | 5/2023 | Mielke | G06N 5/022<br>704/232 |
| 2023/0245654 | A1 * | 8/2023 | Shrivastava | G10L 15/1822<br>704/243 |
| 2023/0315999 | A1 * | 10/2023 | Mohammed | G06F 16/345<br>704/9 |
| 2023/0325725 | A1 * | 10/2023 | Lester | G06N 3/0455 |
| 2023/0409615 | A1 * | 12/2023 | Khemka | G06V 20/68 |
| 2024/0241902 | A1 * | 7/2024 | Shalmashi | G06F 16/35 |
| 2024/0394176 | A1 * | 11/2024 | Pean | G16H 70/20 |
| 2024/0412226 | A1 * | 12/2024 | Mathur | G06F 9/453 |

OTHER PUBLICATIONS

Ghazarian, et al., "Better Automatic Evaluation of Open-Domain Dialogue Systems with Contextualized Embeddings", In Proceedings of the Workshop on Methods for Optimizing and Evaluating Neural Language Generation, Jun. 6, 2019, pp. 82-89.
Macavaney, et al., "One-Shot Labeling for Automatic Relevance Estimation", In Repository of arXiv:2302.11266v1, Feb. 22, 2023, 5 Pages.
Vu, et al., "AVA: an automatic eValuation approach for question answering systems", Retrieved from: https://www.amazon.science/publications/ava-an-automatic-evaluation-approach-for-question-answering-systems, May 2, 2020, 11 Pages.
Kojima, et al., "Large Language Models are Zero-Shot Reasoners", In Repository of arXiv:2205.11916v4, Jan. 29, 2023, 42 Pages.

* cited by examiner

SYSTEM AND METHOD OF EVALUATING RESPONSES PROVIDED BY LARGE LANGUAGE MODELS

BACKGROUND

Recently, there has been a significant increase in the use of machine-learning (ML) models such as large language models (LLM) to provide a variety of services and functions. Many LLMs receive an input such as a text segment and provide a prediction based on the input. Because of the wide use of LLMs, it is important that such models provide accurate results. However, even when aggregate accuracy is high, LLMs often fail when providing responses relating to specific domains such as specific products or topics. As a result, it is important to finetune an LLM when it is being used for a specific domain. However, finetuning an LLM to a specific domain such as a product area is a challenging undertaking. It often requires expensive training and human intervention. Moreover, even when finetuning is achieved, an LLM can sometimes provide irrelevant, inaccurate and/or harmful content.

Hence, there is a need for improved systems and methods of evaluating responses provided by LLMs.

SUMMARY

In one general aspect, the instant disclosure presents a data processing system having a processor and a memory in communication with the processor wherein the memory stores executable instructions that, when executed by the processor, cause the data processing system to perform multiple functions. The functions receiving a product help inquiry provided via a user interface element of an application; generating a prompt, using a prompt generating engine, based on the product help inquiry for transmission as an input to a language model; retrieving a response provided to the user query by the language model; extracting an action path included in the response based on a context of the response, the action path comprising a sequence of terms included in the response, each term referring to an action for performing one or more tasks associated with the product help inquiry; generating contextual embeddings for one or more terms of the extracted action path, the contextual embeddings taking a context of the product help inquiry into account; measuring a semantic similarity between the contextual embeddings for the extracted action path and embeddings generated for an expected response action path associated with the product help inquiry; measuring a path coverage metric for the extracted action path; and determining a total evaluation value for the extracted action path based on a weighted combination of one or more of the measured semantic similarity, path coverage metric, a path length metric or a path frequency metric.

In yet another general aspect, the instant disclosure presents a method for automatically evaluating performance of a model used in providing a response to a product help inquiry. In some implementations, the method includes receiving the product help inquiry; classifying the product help inquiry as being associated with a topic related to a product via a classifier; retrieving a path of actions provided in a help documentation associated with the topic; providing a prompt generated, via a prompt generating engine, based on the product help inquiry for transmission to the model as an input; receiving a response provided by the model as an output; extracting a path of actions included the response the path of actions comprising a sequence of terms that refer actions included in the response for performing one or more tasks in the application; generating contextual embeddings for the terms in the extracted path of actions, each contextual embedding being a word representation that captures a meaning of each term within a context of the product help inquiry; measuring a semantic similarity between the contextual embeddings for the extracted path of actions and embeddings generated for the path of actions provided in the help documentation; measuring a path coverage metric for the extracted path of actions; and determining a total evaluation value for the extracted path of actions based on a weighted combination of one or more of the measured semantic similarity, path coverage metric, a path length metric or a path frequency metric.

In a further general aspect, the instant application describes a non-transitory computer readable medium on which are stored instructions that when executed cause a programmable device to perform functions of extracting an action path included in a response provided by a model to a product help inquiry, the action path comprising a sequence of terms included in the response, each term referring to an action for performing one or more tasks associated with the product help inquiry; measuring a semantic similarity between the extracted action path and an expected response action path for the product help inquiry by comparing contextual embeddings for the extracted action path with embeddings for the expected response action path; measuring a path coverage metric for the extracted action path based on the expected response action path; assigning one or more weights to the semantic similarity and the path coverage metric, and one or more of a path length metric and path frequency metric; and combining two or more of the weighted semantic similarity, weighted path coverage metric, weighted path length metric and weighted path frequency metric to generate a total evaluation value for the response.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
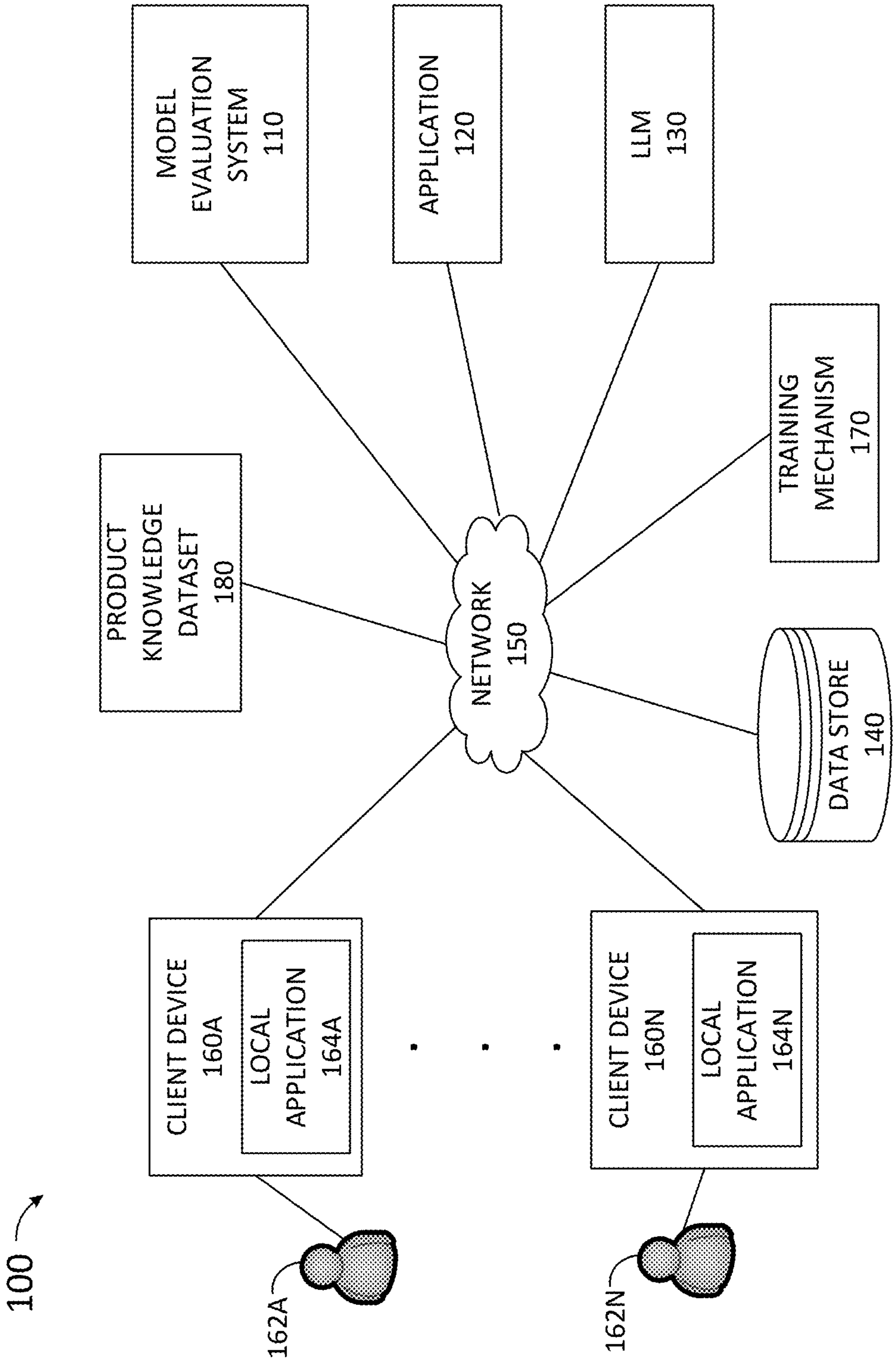
FIG. 1 depicts an example system upon which aspects of this disclosure may be implemented.

Artificial intelligence (AI) models that can recognize, summarize, translate, predict and/or generate text and other content based on knowledge gained from large training datasets, are referred to in this disclosure as language models or LLMs. Examples of such AI models include Generative Pre-trained Transformers (e.g., GPTs). Language models can be used in a variety of manners. For example, an LLM such as a ChatGPT chatbot can be used by an application as an assistant or copilot that assists the user in utilizing the application. In an example, the user can ask the chatbot how to perform a specific function within the application (e.g., how do I create a calendar event?). This provides an easy-to-use interface by which users can determine how to use an application or any other product. However, in order to ensure that the LLM provides accurate responses to user questions, the LLM would need finetuning with information related to the specific application or product. Finetuning an LLM, however, is often an expensive undertaking. That is because when focusing on a specific domain, it is often difficult to test and engineer prompts in a way that is scalable and has sufficient samples. Moreover, even a finetuned LLM may still exhibit failures in specific domains of data. For example, the LLM may provide harmful, inaccurate or irrelevant responses to specific queries. In an example, the response given might be written well but might have incomplete knowledge of the query. In another example, the response may miss certain steps that are crucial information for the user in performing an action. Such responses result in user frustration, inefficiency and erosion of user trust in the product. Thus, when considering integrations and implementations of LLMs in various tools and applications, it is important to have a reliable metric for evaluating the model's success and the specificity of the model to a specific domain (e.g., specific product). This is particularly true for an LLM that is finetuned to provide responses to product help inquiries, where the response may need to include a sequential number of steps for performing an action in the application.

Current mechanisms for model evaluation and finetuning, however, cannot be used on a very large dataset. Furthermore, proof checking model responses often requires an entire layer of abstraction to ensure that no harmful content is shown and that the product itself is represented in a good light. This requires a robust testing system that can evaluate the quality of the generative chatbot and includes relevant boundaries that limit the responses to the specific domain. Such a testing system would require extensive computer resources to operate. For example, ensuring that model response is accurate often requires generating contextual embeddings for all or a majority of the terms in the response, so that the response can be evaluated and/or compared with an expected response. For a complex and/or lengthy response, this involves generating contextual embeddings for a large number of terms, which requires extensive computing resources, as generating contextual embeddings is a computing resource-intensive endeavor. This results in a slow evaluation of the response and/or unnecessary use of computing resources. Moreover, there are no current mechanisms for evaluating model responses in real time as the responses are provided. In short, conventional AI model evaluation techniques are too simplistic to evaluate responses that include complicated action paths associated with sophisticated products. Thus, there exists a technical problem of lack of efficient mechanisms to finetune an LLM to provide responses to product help inquires for a specific product and to evaluate the model responses efficiently and accurately.

To address these technical problems and more, in an example, this description provides technical solutions for extracting action paths included in responses provided by a language model to product help queries, the action paths being extracted based on context of the responses, and comparing the extracted action paths with expected paths to evaluate accuracy and completeness of the responses. This involves measuring path accuracy and path coverage, and providing a custom measurement metric that evaluates the results. In some implementations, the evaluation results are fed back into the language model to improve future responses, thus forming an automated real-time feedback loop. Furthermore, the response may be modified before being presented to the user to avoid providing inaccurate, inadequate and/or irrelevant responses. The process includes steps for accurately extracting an action path provided in the response, comparing the action path via pairwise cosine similarity calculation with an expected path, and utilizing a path weighing process and path weighing algorithm for evaluating the response.

The technical solution evaluates LLM responses based on multiple factors including path coverage to determine if important instruction steps are included in the response and whether the steps are in a correct order. Moreover, the technical solution utilizes scoring techniques to generate an aggregate custom measurement metric for a given response. The metric is then used to correctly create prompts for the LLM (e.g., in prompt engineering) and to finetune the LLM in an iterative manner. By using the measured custom metric, the technical solution can evaluate the effectiveness of the LLM in a live setting. A high value for the measured metric indicates that the LLM can provide satisfactory responses to users quickly and efficiently, thus improving user satisfaction. A low value for the metric, on the other hand, may indicate that the LLM is not able to handle user queries effectively and may require further refinement or additional training. This enables efficient evaluation of an LLM in providing responses to user help inquiries for a product and results in an improved evaluation and optimization process that is more efficient and directed to improving the performance of the language model in a specific domain.

The technical solutions described herein addresses the technical problem of lack of adequate and efficient evaluation algorithms for evaluating responses provided by a language model that include instructional information having complex action paths associated with performing certain actions using a specific product. The technical solution utilizes an inexpensive evaluation mechanism that reduces the amount of computing resources required to generate contextual embeddings for a response by first extracting an action path from the response and then generating the contextual embeddings for only the terms in the extracted action path. This significantly reduces the amount of computing needed and as such improves the operation of the computing devices involved in evaluating the response.

Moreover, the evaluation mechanism offered by the technical solution provides real time evaluation, and enables improving the prompts generated for the language model and finetuning of the language model in an iterative manner that can significantly improve the responses provided by the language model for product help inquires. The technical effects include at least (1) reducing the amount of computing resources required to evaluate model responses to product help inquiries; (2) improving the accuracy, relevancy and completeness of responses provided by a language model to product help inquires by utilizing a custom metric that measures various parameters of the responses including path coverage and path accuracy to evaluate the responses; and (3) utilizing the measured metric to finetune the language model and to generate more appropriate prompts for the language model.

FIG. 1 illustrates an example system 100, upon which aspects of this disclosure may be implemented. The system 100 includes a model evaluation system 110, an application 120, an LLM 130, a data store 140, a training mechanism 170, a product knowledge dataset 180 and a plurality of client devices 160A-160N (collectively referred to as client device 160). Each of the model evaluation system 110, application 120, LLM 130, data store 140, training mechanism 170, and product knowledge dataset 180 may be stored on and/or executed by one or more servers that work together to deliver the functions and services provided by each service or application included in the servers.

The application 120 is an online computer program executed on a server (not shown) to provide the application functionalities via an online service. The application 120 communicates via the network 150 with a user agent (not shown), such as a browser, executing on the client device 160. The user agent may provide a UI that allows the user to interact with the application 120. The application 120 and local applications 164A-164N (collectively referred to as local application 164) may be any application that enables a user such as users 162A-162N (collectively referred to as user 162) to interact with the application to perform an action or achieve a purpose. The application 120 is a web application, while the local application 164 is a native application that is executed on the client device 160. Examples of suitable applications include, but are not limited to, a communications application (e.g., Microsoft® Teams®), presentation application, design application, word processing application, spreadsheet application, social media application, and any other application for which a user may require help. In some implementations, the application 120 and/or local application 164 is an application that enables the user to interact with the application to receive product help for one or more products or applications. For example, application 120 may be an application that is configured to provide responses to product help inquiries for various products.

The network 150 is a wired or wireless network(s) or a combination of wired and wireless networks that connect one or more elements of the system 100. The client device 160 is a personal or handheld computing device having or being connected to input/output elements that enable the user 162 to interact with various applications such as the online application 120 and local application 164. Examples of suitable client devices 160 include but are not limited to personal computers, desktop computers, laptop computers, mobile telephones, smart phones, tablets, phablets, smart watches, wearable computers, gaming devices/computers, televisions, and the like. The internal hardware structure of a client device and/or a server on which one of the model evaluation system 110 or LLM 130 is executed is discussed in greater detail with respect to FIGS. 6 and 7.

To enable users to efficiently receive responses to product help inquiries, the application 120 and/or application 164 provides a user interface element for users to submit help inquiries. In some implementations, the queries are transmitted from the application 120 and/or application 164 to the model evaluation system 110 for examination and preprocessing before, the queries or a revised version of the queries is transmitted to the LLM 130 for processing.

The LLM 130 is a language model which may be deep learning algorithm that can recognize, summarize, translate, predict and/or generate text and other content based on knowledge gained from large training datasets. Examples of language models include, but are not limited to, generative models, such as GPT-based models, e.g., GPT-3, GPT-4, ChatGPT, and the like. The application 120 and/or application 164 may utilize the LLM 130 to provide responses to product help inquiries about the applications and/or about specific products. In some implementations, the application 120 and/or application 164 utilize the LLM 130 to provide an application copilot that assists users in navigating application features and/or performing actions within the application.

In some implementations, the model evaluation system 110 receives a user query from the application 120 and/or local application 164 and performs preprocessing on the user query to ensure the query is related to the specific product and/or application for which assistance is being offered by the application. After preprocessing the user query, the model evaluation system 110 transmits the query to the LLM 130 for processing. In some implementations, the model evaluation system 110 utilizes a prompt generation engine (shown in FIG. 2) to generate a prompt that is likely to result in accurate and/or relevant responses from the LLM 130.

The LLM 130 processes the prompt and generates a response, which is transmitted to the model evaluation system 110 for evaluation. The model evaluation system 110 then processes the response by first enriching the response, if needed, before extracting an action path from the response, comparing the action path to an expected path, examining path coverage and measuring an overall evaluation metric for the response. An excepted path for the response may be determined by querying the product knowledge dataset 180, which contains a database of help documentations for a product and/or application for which the application provides responses to help inquiries. For example, the product knowledge dataset 180 may contain a database of support articles generated for an application such as application 120 or local application 164. Depending on the value of the evaluation metric and/or the value of path similarity, the response may be provided to the user 162 or a notification may be provided that a response to the user query is not available. Additionally, the model evaluation system 110 provides the value of the measured evaluation metric and the response to the training mechanism 170 for finetuning the LLM 130. Further details regarding the operation of the model evaluation system 110 is provided with respect to FIG. 2.

In some implementations, a given user query, the response provided by the LLM 130 and/or the value of the measured evaluation metric for the response are stored in the data store 140 for use by the training mechanism 170 in finetuning the LLM 130 or for use in training the prompt generation engine to generate prompts for the LLM 130. Thus, the training mechanism 170 uses training data sets stored in the data store 140 to provide ongoing and real time training for the LLM 130.

The data store 140 functions as a repository in which databases relating to training, finetuning, and evaluation of the LLM 130 are stored. Although shown as a single data store, the data store 140 is representative of multiple storage devices and data stores which may be accessible by one or more of the model evaluation system 110, training mechanism 170, LLM 130, and/or client devices 160.

Figure 2:
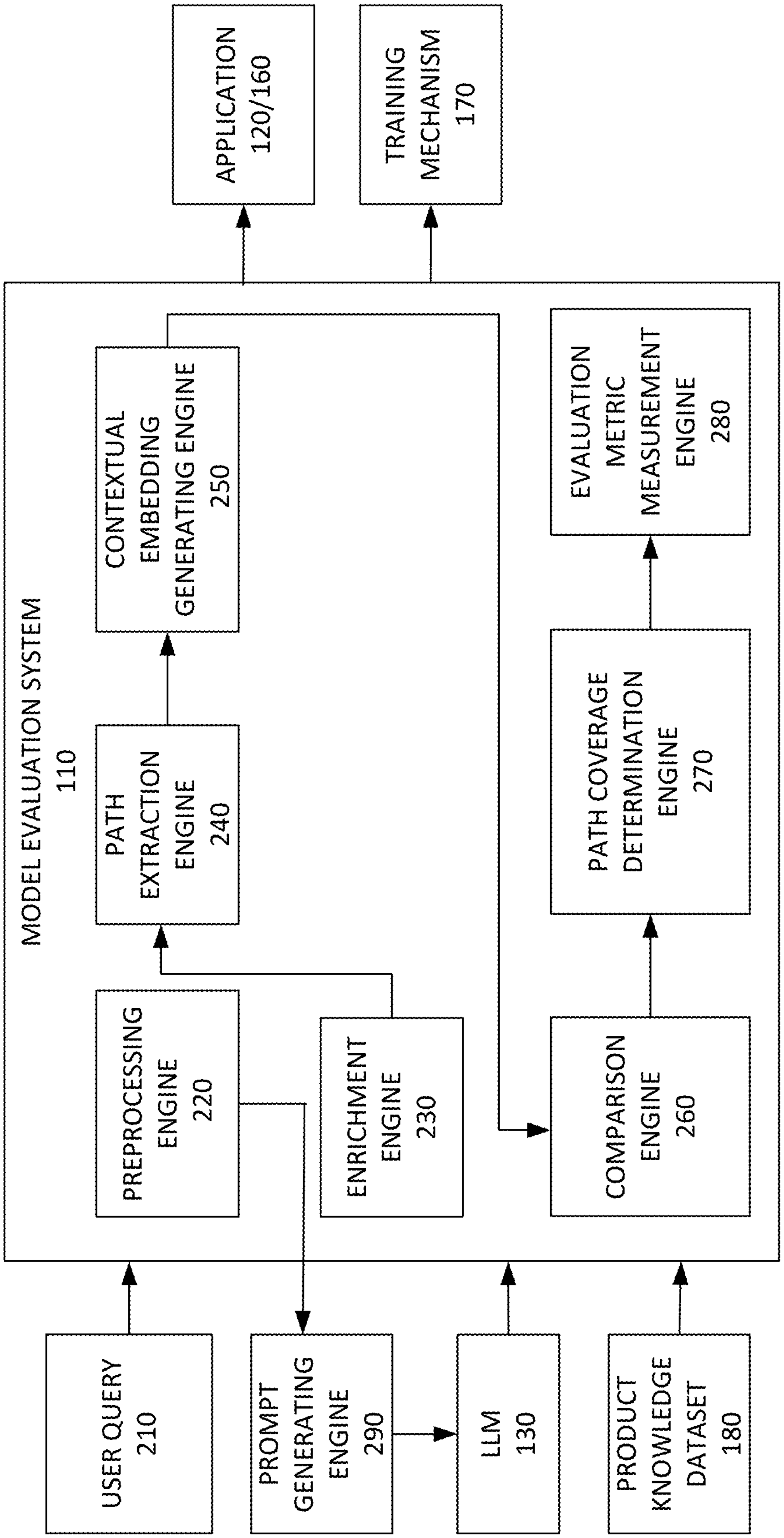
FIG. 2 depicts an example of some elements involved in evaluating a model used for providing responses to product help inquiries.

FIG. 2 depicts an example of some elements involved in evaluating an LLM used for providing responses to product help inquiries. Once a user query 210 is received (e.g., via a user interface element of an application), the user query 210 is transmitted to the model evaluation system 110 for processing. In some implementations, the user query 210 is retrieved by making inference calls to an application programming interface (API) that refers to the LLM 130. The user query 210 may be in the form of text, voice or any other format that the LLM 130 supports. In some implementations, when the user query 210 is in a format not supported by the LLM 130, a conversion engine is used to convert the input to a supported format (e.g., voice to text).

The model evaluation system 110 utilizes the preprocessing engine 220 for performing preprocessing operations on the user query 210 before it is submitted to the LLM 130. In some implementations, the preprocessing operations involve first determining whether the user query 210 relates to the product or application for which assistance is being offered. This may involve extracting some of the key terms and/or sequential steps provided in the user query 210. The key terms are then examined to determine if they are related to the product. The preprocessing engine 220 achieves this by utilizing one or more classifiers that classify the user query 210 as being associated with one or more topics for which help documentation is available. This may involve using classifications that correspond with topics of help documentations available in the product knowledge dataset 180. For example, when the product for which assistance is being offered is Microsoft Teams, the preprocessing engine 220 utilizes a classifier to classify the user query 210 as being associated with chat, meeting, calendar, calls, files, or any other class of features offered by Teams, for which help documentation is available in the product knowledge dataset 180. The preprocessing engine 220 also detects when the user query 210 is not related to any class of topics for which help documentation is available.

In some implementations, when the preprocessing engine 220 determines that the user query 210 is not related to the product/application for which assistance is being offered, the model evaluation system 110 provides a notification to the application 120/160 that a response to the user query 210 is not available. The application 120/160 may then provide a notification to the user that the query resulted in a failure. In some implementations, the user query 210 which resulted in a failure is stored in a database for future reference and evaluation. This ensures that the queries submitted to the LLM 130 are not irrelevant or harmful. This is advantageous in ensuring that information used to finetune the model is relevant and is likely to improve the model. In other implementations, when it is determined that the user query is not related to the specific product/application, the query is provided to the prompt generating engine which in turn generates a prompt that is closely related to the user query 210 and is also related to the product/application.

When the preprocessing engine 220 determines that the user query 210 is related to the product/application for which assistance is being offered, the preprocessing engine 220 may classify the user query 210 as being associated with a specific topic or subject matter for which help documentation is available. This may help in identifying the expected path from the product knowledge dataset 180, as discussed in more details below.

After classifying the user query 210, the preprocessing engine 220 transmits the user query 210 to the prompt generating engine 290 to generate a prompt based on the user query 210 for the LLM 130. In some implementations, the prompt generating engine 290 constructs a prompt in a manner that is likely to result in a relevant and/or accurate response from the LLM 130. This may involve removing terms from the user query 210 that are not related to the subject matter for which help is being sought (e.g., verbose terms), replacing some terms with synonyms that are more directly related to the product, addressing grammar mistakes or typos and the like. The prompt generating engine 290 may also construct the prompt in a manner that corresponds with the format and type of input accepted by the LLM 130. In some implementations, the prompt generating engine 290 is part of the preprocessing engine 220 or is otherwise part of the model evaluation system 110.

The generated prompt is provided as an input to the LLM 130. In response, the LLM 130 generates a response to the user query 210, which is transmitted to the model evaluation system 110 for evaluation before being provided to the user. The model evaluation system 110 utilizes an enrichment engine 230 to first evaluate the response for form before the response is evaluated for substance. The enrichment engine 230 may include and/or utilize various elements for examining the response for grammar, spelling, formatting and the like. For example, the enrichment 230 may utilize a spell-checker to ensure the words in the response are spelled correctly, and when misspelled words are detected the enrichment engine 230 may correct the spelling. This step may be performed to ensure that the response complies with the format expected for a response to help inquiry. The enriched response is then transmitted to the path extraction engine 240.

In some implementations, the response is first transmitted to the path extraction engine 240 and if the path extraction engine 240 is unable to extract a path, then the response is transmitted to the enrichment engine 230 for enrichment before being transmitted back to the path extraction engine 240. In that case, the response undergoes an enrichment process that may include bullet formatting, highlighting command names, removing verbose statements, correcting grammar and the like to ensure the response is in a format from which a path can be extracted. When the response requires enrichment, an enrichment metric value is measured for the enrichment process which reflects the extent of revision needed for the response. This enrichment metric value is used in calculating the final evaluation metric by penalizing the response for the enrichment required.

The path extraction engine 240 examines the response to extract a relevant path of actions included in the response. The terms "action path", "path of actions" or path as used herein refer to a sequence of terms included in a response from the language model or in a help documentation, where each term refers to an action a user takes or refers to a user interface elements a user selects to take an action to perform a task associated with the product help inquiry., the extracted action path is a sequence of terms used in the response that correspond with specific actions or user interface elements in the product. For example, the action path for the example response depicted in FIG. 4B which explains how to create a new calendar meeting, is "New Meeting", "Invite People", and "Send." The actions correspond with specific user interface elements of the meeting application. The path extraction engine 240 may utilize information about the product/application to retrieve key terms in the response that are associated with product actions/UI elements. In an example, the path extraction engine 240 refers to the source code for the application and/or resource files within the application source code to achieve this. In some implementations, the path extraction engine 240 calculates a score for each term in the response and terms for which the calculated score exceeds a give threshold are identified as being part of the extracted action path. It should be noted that the extracted action path includes a sequence of terms that are in order. This ensures that the response is accurate in providing the sequence of steps that need to be taken to perform an action.

Once the path is extracted, information about the extracted path is transmitted to the contextual embedding generating engine 250 to generate contextual embeddings for the extracted path. Contextual embeddings as used in this disclosure refer to a type of word representation that captures the meaning of a word based on its context within a sentence or document. Unlike traditional word embeddings, which assign a fixed vector representation to each word regardless of its context, contextual embeddings take into account the surrounding words and the overall sentence structure. Contextual embeddings have several advantages over traditional word embeddings. For example, they are more suitable for capturing meaning of words in different contexts, as the same word can have different implications depending on its surrounding words. Contextual embeddings also handle out-of-vocabulary words more effectively because they can generate contextualized representations for unseen words based on their context. Moreover, contextual embeddings are capable of achieving state-of-the-art performance in various natural language processing (NLP) tasks, such as text classification, named entity recognition, machine translation, and question answering. An example of a model used for generating contextual embeddings is the Transformer-based architecture, which can perform many he contextual embedding generating engine 250 considers context of the terms in the extracted path by, for example, taking terms in a vicinity of each word into account before creating the embedding for the word. Moreover, in creating the contextual embeddings, the contextual embedding generating engine 250 gives more weight to phrases that are product specific and/or within the context of the product or the specific functionality of the product for which help is being sought. Furthermore, the contextual embedding generating engine 250 reduces the level of complexity involved in evaluating the response. That is because, if the system were to calculate embeddings for every term in the response provided by the LLM 130 and treat them equally, a lot of time and computing effort would be spent on making computations for non-relevant terms. Instead, the model evaluation system 110 prioritizes the terms included in the extracted path by assigning a higher weight to the sequences of terms in the extracted path. By extracting the path first before generating the contextual embedding, the model evaluation system 110 also decreases the amount of computational resources required for generating the contextual embeddings. This increases efficiency without adversely affecting the evaluation results, as the extracted path is more likely to include the relevant terms required for the response than the entire response. Thus, by creating a strong sense of locality through the paths, the system reduces the cost (computing resources) of calculating embeddings which is a significant cost reduction for the system.

The contextual embeddings for the extracted path are then transmitted to the comparison engine 260, where they are compared to a set of predefined paths that represent the expected response for the user query 210. The comparison is done using pairwise cosine similarity, which measures the similarity between two vectors. This step determines how closely the extracted paths match the expected response paths. In order to achieve this, first a set of expected response paths are defined for the user query 210. This is done by examining the user query 210 and/or the classification given to the user query 210 by the preprocessing engine 220. The classification is then used to retrieve available help documentation for the user query from the product knowledge dataset 180. Because the help documentation in the product knowledge dataset 180 has already been approved for use for the product, it is likely that the help documentation is correct and includes all the required steps. As such, by comparing the extracted path with the expected response paths of the help documentation, the response provided by the LLM 130 can be easily and efficiently evaluated. In some implementations, the product knowledge dataset 180 includes expected paths for one or more of the help topics for which help documentation is available. In other implementations, once a help article is identified in the product knowledge dataset 180, the path extraction engine 240 is used to extract the path from the help article to generate the predefined expected response paths. These paths represent the concepts or entities that are relevant to the question, and the relationships between them. Once the expected response paths are available, the comparison engine 260 uses cosine similarity to measure a similarity metric between the extracted path and the expected response path(s).

In addition to calculating a similarity metric, the model evaluation system 110 also calculates a path coverage metric. This is achieved by utilizing the path coverage determination engine 270 to measure the percentage of the expected response paths that are covered by the extracted paths. This step ensures that the extracted paths capture the relevant information needed to generate an accurate response. The path coverage determination engine 270 calculates the percentage of expected response paths that are covered by the extracted paths. This may be done using the similarity measurements performed by the comparison engine 260. Alternately, the path coverage determination engine 270 itself compares the steps of the extracted path to the steps of the expected response paths to calculate a metric for the percentage of expected response steps covered by the extracted path. This coverage metric represents the extent to which the extracted paths contain all the relevant information needed to generate an accurate response.

In some implementations, the coverage metric is compared to a threshold value to determine if the extracted path is an acceptable response. The threshold value may be a value below which the LLM response is considered inaccurate. For example, if the response for only includes 70% or below of the steps in the expected response, the LLM response may be considered inaccurate. The threshold value may be predetermined and may vary depending on the application/product, feature, task at hand, and the like. This ensures that responses provided by an LLM in complex and ambiguous contexts are still accurate and reliable. When the coverage metric falls below the required threshold, the model evaluation system 110 may provide a notification to the application 120/164 that a response cannot be provided to the user query. Furthermore, the user query, the response and the calculated metrics may be provided to the training mechanism 170 for finetuning the LLM 130.

The calculated comparison metric, path coverage metric and enrichment metric are then provided to the evaluation metric measurement metric 280 to calculate a final evaluation metric for the response. The evaluation metric measurement metric 280 takes a variety of parameters into account in calculating the final evaluation metric for the response. In some implementations, the evaluation metric measurement metric 280 calculates a path length metric for the extracted path that gives higher weights to shorter paths, as shorter paths are more likely to be relevant to the expected response. Additionally, the evaluation metric measurement metric 280 calculates a path frequency metric that measures the frequency of each extracted path in the knowledge graph. Paths that occur more frequently in the knowledge graph are given a lower weight, as they may represent more general or common concepts. This may involve comparing the contextual embeddings of the extracted path to embeddings generated of the information in the product knowledge dataset 180 to identify action pairs that appear often in the help documentations. For example, an instruction to open the Teams app may appear in a majority of the help articles, and as such may not be an important part of the instructions provided by the LLM 130. Calculating the path frequency metric enables identification of path actions that are not significant or important and taking that into account in evaluating the response. The evaluation metric measurement metric 280 measures the total evaluation metric for the extracted path by combining one or more of the similarity, path coverage, path length, path frequency, and path enrichment metrics. One or more of the metrics may be given different weights in calculating the final evaluation metric. For example, path coverage may be given more weight than path frequency. The weights may depend on the specification product/application or task at hand. In some implementations, multiple responses from the LLM 130 are retrieved and evaluated for a given user query 210 and the response having the best evaluation metric is selected as the response that is presented to the user. In an alternative implementation, the responses are combined based on their evaluation metric values and/or specific calculated metrics for similarity, path coverage, etc. to generate a more complete response to the user query. The selected response, its metric evaluation metric values, and the associated user query 210 are then provided to the training mechanism 170 for finetuning the LLM 130. In some implementations, the selected response, its evaluation metric values, and the associated user query 210 are sent to a data store such as the data store 140 of FIG. 1 for storage and future use in finetuning the model. The selected response is also provided to the application 120/164 for being presented to the user that submitted the query.

Figure 3:
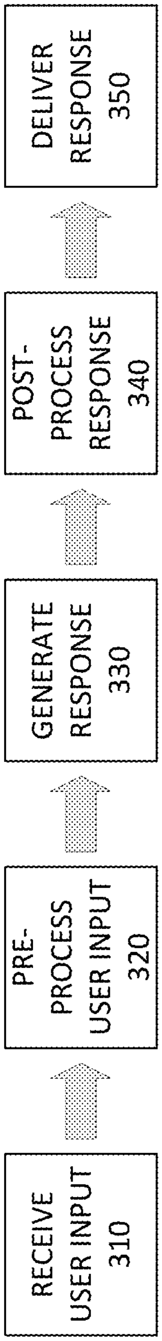
FIG. 3 depicts a simplified example of the steps involved in evaluating a response provided by a language model.

FIG. 3 depicts a simplified example of the steps involved in evaluating a response provided by a language model. As depicted, the first step in the process involves receiving a user input 310. As discussed before, the user input may be provided via a UI element of a UI screen that provides an interface to a language model, where the language model provides response to user inquires about a product. A product as used in this disclosure refers to any physical or software product or service, for which a user may need help in operating, troubleshooting the product or in performing an action via the product. Once received, the user input is preprocessed at 320. Preprocessing includes determining if the user input is related to the product for which help is being provided and may also include identifying a specific topic of the product the user input is associated with. Preprocessing may also include revising the user input to optimize it for submission as a query to the language model. This may include removing unnecessary words or phrases, rewriting certain phrases, reformatting the user input and/or addressing grammar and/or spelling errors.

After preprocessing, a response is generated from the language model, at 330, before the response undergoes post-processing at 340. Post-processing includes evaluation of the response via the techniques disclosed here and may include reformatting and rewriting the response. Post-processing also includes determining if the response is appropriate, complete and/or accurate for the user input. This may involve examining various measured parameters of the response and determining if one or more of the measured parameters meet a required threshold value. When the response is determined to be satisfactory, it is delivered at 350. The response may be delivered via a UI screen to the user that submitted the user input.

Figure 4A:
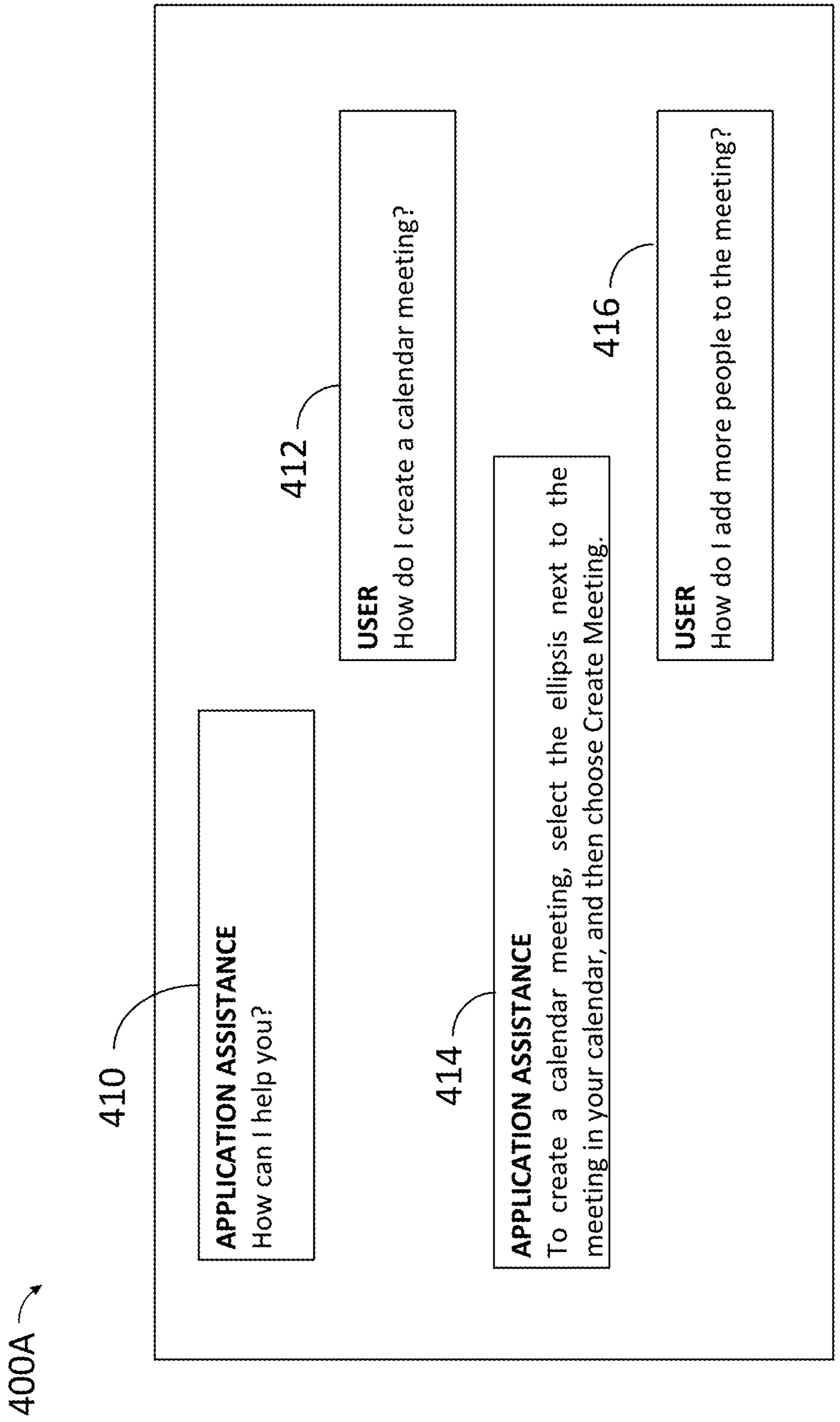
FIGS. 4A-4C depict example user interface (UI) screens of an application that utilizes a language model to provide responses for product help inquiries.
Figure 4B:
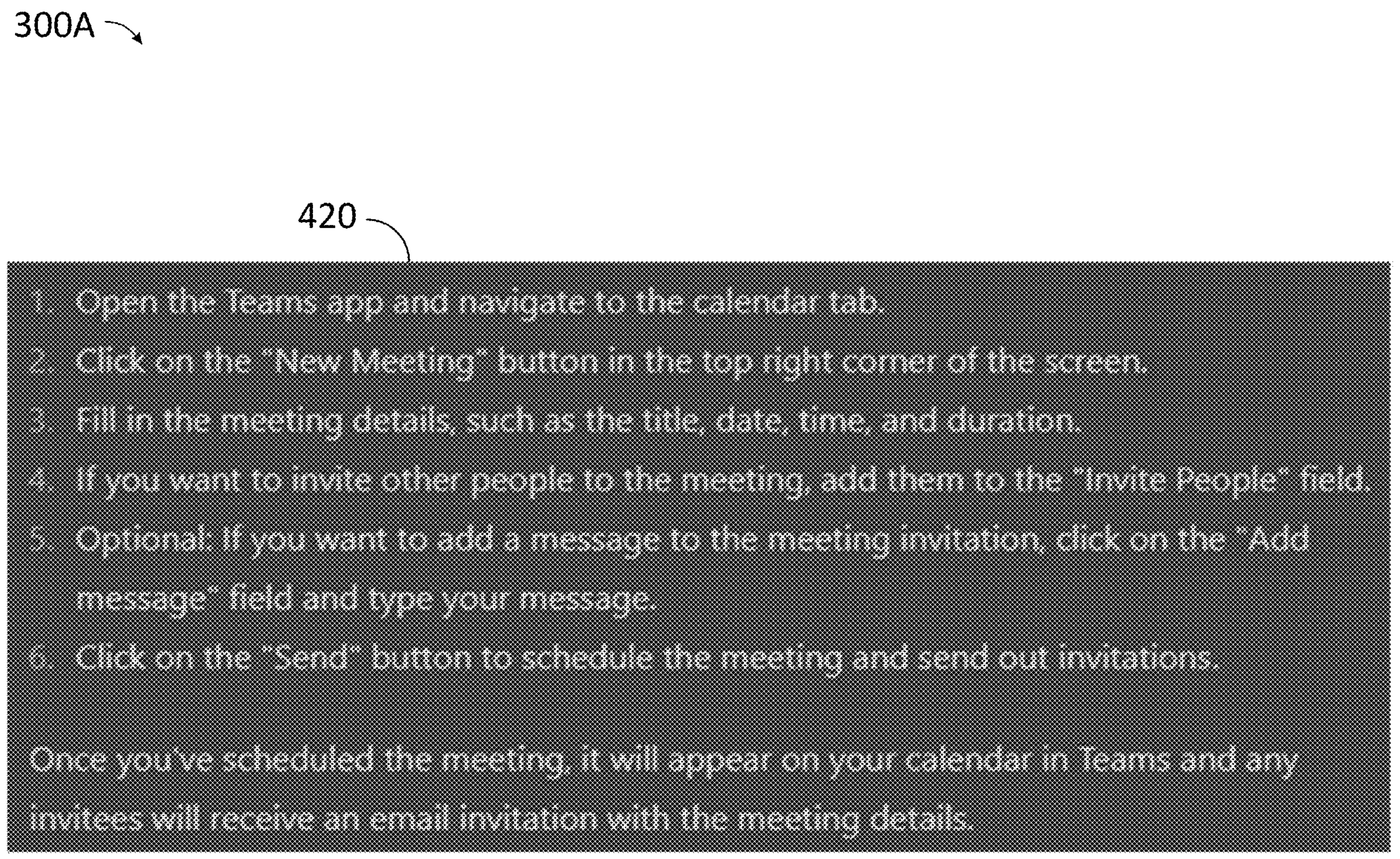
Figure 4C:
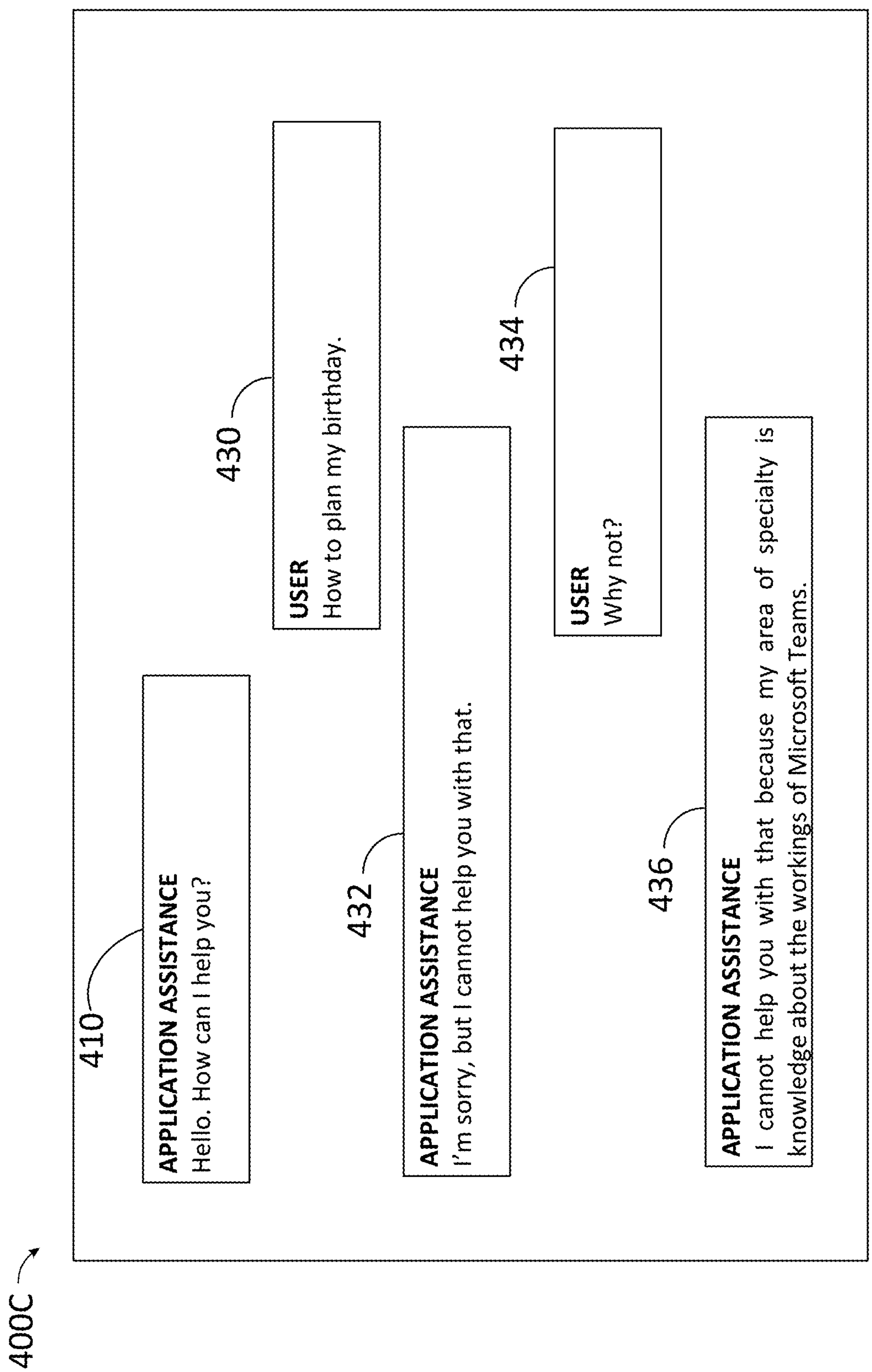

FIGS. 4A-4C depict example user interface (UI) screens of an application that utilizes a language model to provide responses to product help inquiries. FIG. 4A depicts an example graphical user interface (GUI) screen 400A of an application that provides an assistant (e.g., a copilot) for utilizing the application. In an example, the assistant if provided for a communications application such as Microsoft Teams. As depicted, the assistant may begin the conversation (e.g., when a user invokes the assistance) by displaying a UI element 410 that asks how it can help the user. The user can utilize a UI element 412 to enter a user query. In the example depicted in screen 400A, the user seeks guidance in creating a calendar meeting. In response, the assistant (e.g., language model) provides summarized instructions on how to create a calendar meeting using the application by displaying the instructions in a UI element 414. Before the response is provided to the user, however, the evaluation system discussed in this disclosure is used to ensure that the response meets certain requirements. The user may continue seeking guidance and asking more detailed questions about the product, by for example, utilizing the UI element 416.

FIG. 4B depicts an alternative example of displaying the response. The response depicted in the UI element 420 of FIG. 4B includes more detailed instructions on how to create a new meeting in the application. In some implementations, the instructions displayed in the UI element 420 are what is provided by the language model and the evaluation system disclosed herein summarizes the response using the extracted action path to provide a response similar to the response displayed in the UI element 414.

FIG. 4C depicts a GUI screen 400C which illustrates an example user query for which a response cannot be provided. The user query provided in the UI element 420 is very general and not related to the communications application for which the assistant is being provided. As a result, during the preprocessing, the user query may be identified as not corresponding to the product or to a classification of help topics provided for the product. As a result, the notification displayed in the UI element 432 may be provided before the user query is provided to the language model to inform the user that a response to their query is not available. Alternatively, the user query may be provided to the language model and the response may be determined as not meeting the requirement thresholds, in which case the notification is also provided. In some implementations, the user may seek further information about their query, by for example, asking why a response is not available in the UI element 434. In which case, the language model may provide a response, via the UI element 436, which while does not include instructions, responds to the user query.

Figure 5:
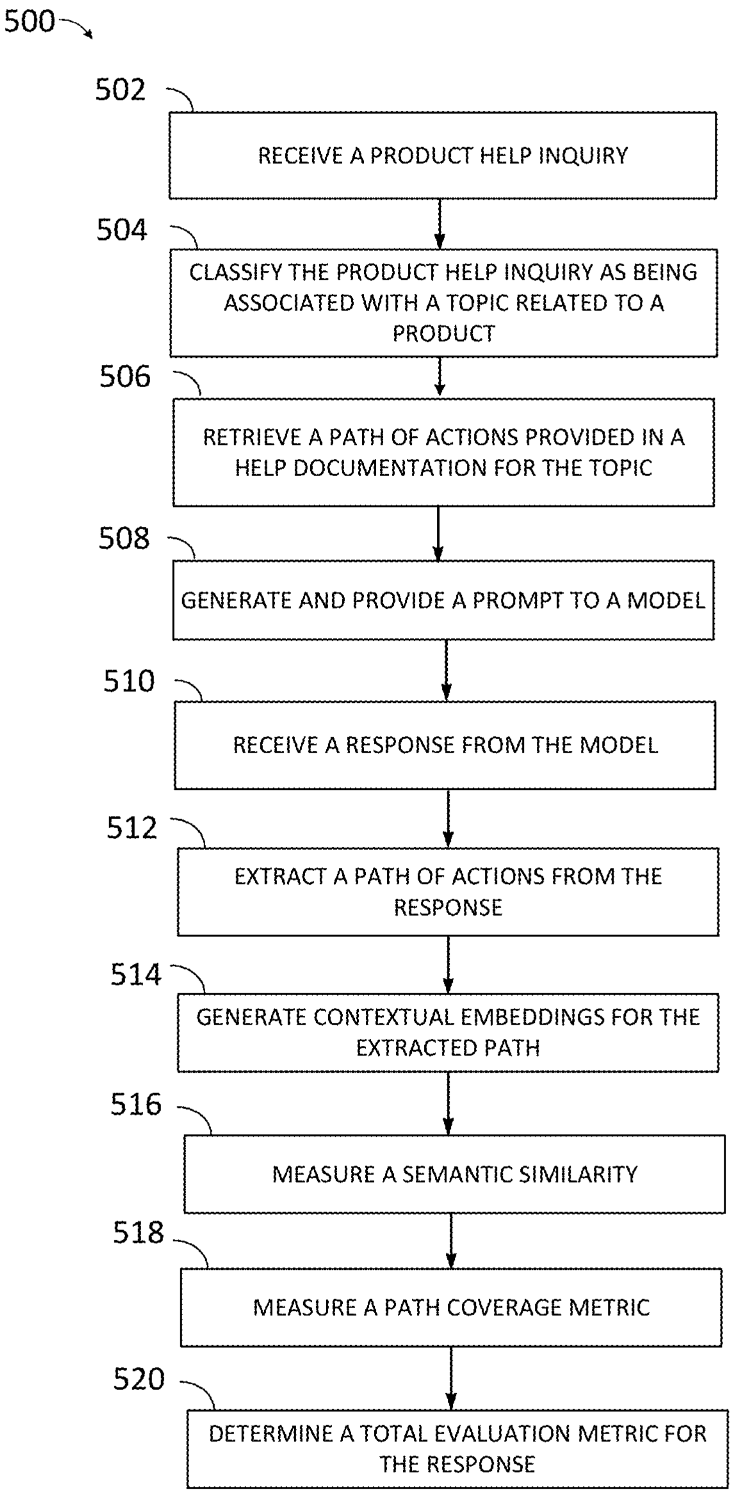
FIG. 5 is a flow diagram depicting an example method for automatically evaluating performance of a model used in providing a response to a product help inquiry.

FIG. 5 is a flow diagram depicting an exemplary method 500 for automatically evaluating performance of a model used in providing a response to a product help inquiry. One or more steps of method 500 may be performed by a model evaluation system such as the model evaluation system 110 of FIGS. 1-2. Method 500 beings by receiving a product help inquiry, at 502. The product help inquiry may be received via a UI element of an application or a copilot provided by an application that enables a user to submit help queries regarding use of the application or another product. The product help inquiry may be in a natural language format and may be received in text, audio or other formats. In some implementations, the application or copilot transmits the user query to the model evaluation system for processing or the model evaluation system may retrieve the user query via, for example, an API call.

After receiving the product help inquiry, method 500 proceeds to preprocess the help inquiry by classifying the help inquiry as being associated with a topic related to a product, at 504. In some implementations, this involves utilizing one or more classifiers. For example, a first classifier may be used to determine whether the product help inquiry is associated with a specific product and when it is determined that the help inquiry is associated with the specific product, another classifier may be used to identify which topic associated with the product the help inquiry is related to. This may involve retrieving information from a product knowledge dataset which may include help documentation associated with the product. The help documentation may be a collection of multiple help documentations (e.g., help articles) associated with different features and functionalities provided by the product. The help documentations may provide a set of actions that need to be taken in the product (e.g., in the application) to achieve a desired result (e.g., steps that need to be taken to create a calendar meeting). Other preprocessing steps may include determining whether the product help inquiry requires revision before being submitted as a query to a model (e.g., correcting spelling, grammar and/or formatting errors).

Once the product help inquiry has been classified as being associated with a topic related to the product, method 500 proceeds to retrieve a path of actions provided in a help documentation associated with the topic, at 506. This may involve examining the help documentation dataset to identify a matching help documentation. This step may also include extracting the series of actions provided in the help documentation (e.g., actions specified in the instructions). In some implementations, the actions have already been extracted and form an expected response action path for help inquiry.

Method 500 also generates a prompt for submission to the model that is able to provide responses to the product help inquires for the product and provides the prompt to the model, at 508. Prompt generation may be performed by a prompt generation engine. This involves generating a prompt that includes the product help inquiry received from the user or a modified version of the product help inquiry that is likely to result in the model providing a more relevant response.

Once the prompt is transmitted to the model, a response to the product help inquiry is received from the model, at 510. The response may include a set of instructions (e.g., an ordered list of actions) to follow to achieve the results indicated in the product help inquiry. This list of actions may be referred to as a path of actions. Method 500 proceeds to extract this path of actions from the response, at 512. This may involve use of an ML model and/or one or more classifiers and utilizing a resource code for the application to identify commands provided by the application or UI elements used by the application that are included in the response.

After the path of actions for the response has been extracted, method 500 proceeds to generate contextual embeddings for the extracted path, at 514. In some implementations, method 500 also includes enhancing the quality of the response by for example removing extraneous terms, addressing formatting, grammar, or spelling mistakes and the like. This may be done before the contextual embeddings are generated. The generated contextual embeddings are then compared with embeddings of the expected response path to measure a semantic similarity between the response and an expected response for the product help inquiry, at 516. This may be done by performing pairwise semantic similarity measurements between actions of the extracted path and actions of the expected response path. The semantic similarity measurement may be a cosine similarity measurement.

Method 500 also includes measuring a path coverage metric, 518. Path coverage is measured by comparing the steps included in the extracted path with the steps included in the expected response path to determine the number of overlapping actions. In some implementations, the measured path coverage metric (e.g., number of overlapping actions) is compared to a threshold value and if the measured path coverage metric does not meet the threshold value, the response is identified as being inaccurate (e.g., if the extracted path only includes 2 out of 5 actions included in the expected response path, the response is inaccurate).

After measuring the path coverage metric, method 500 determines a total evaluation value for the response by calculating a weighted combination of the semantic similarity, path coverage metric, and one or more of a path length metric and a path frequency metric. In some implementations, the total evaluation value also includes a weighted value for a metric that correspond with the amount of enhancement needed for the response. The total evaluation value is then used to determine whether the response is accurate enough to be provided to the user and may also be used in finetuning the model to optimize the performance of the model.

Figure 6:
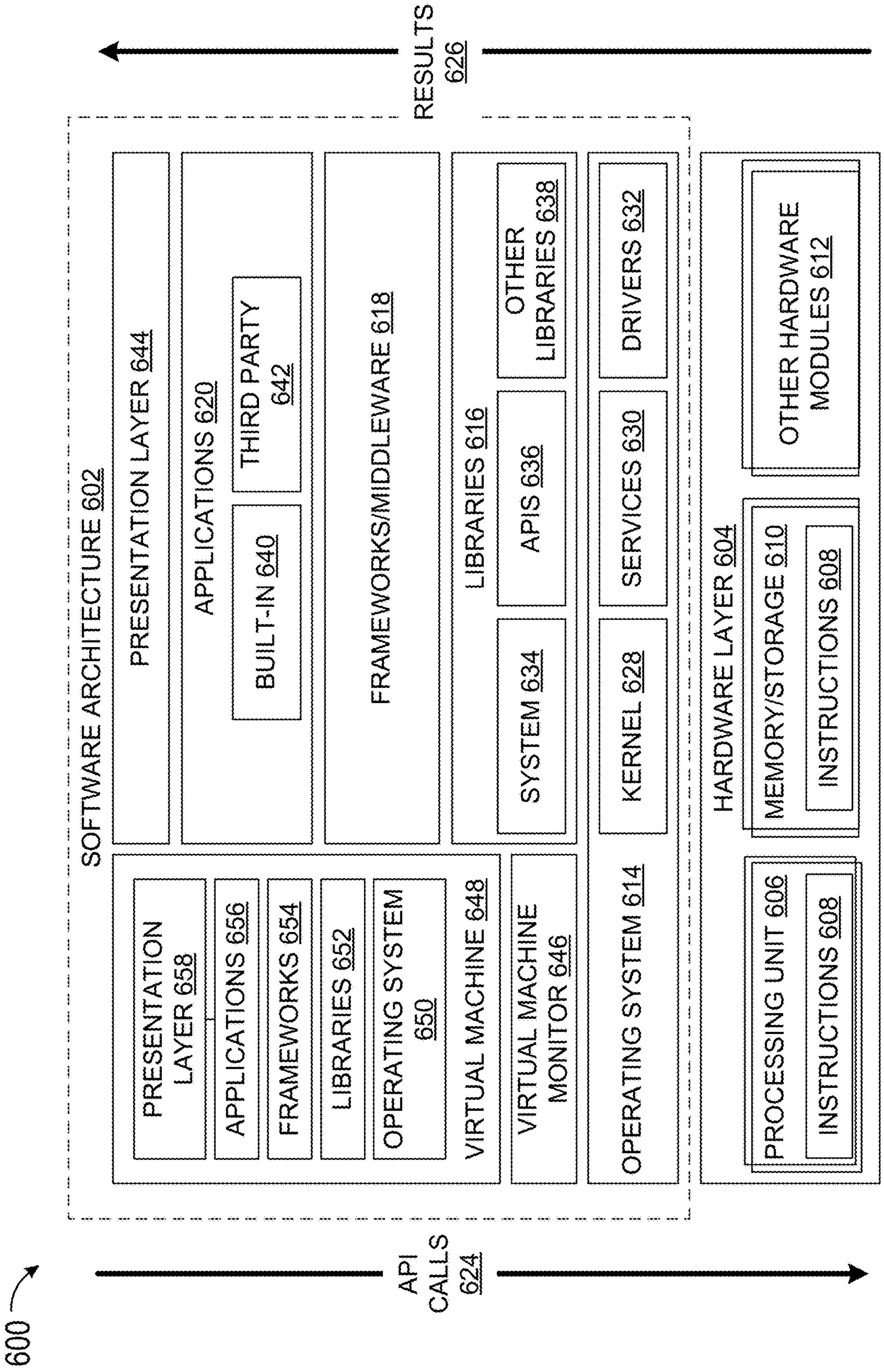
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
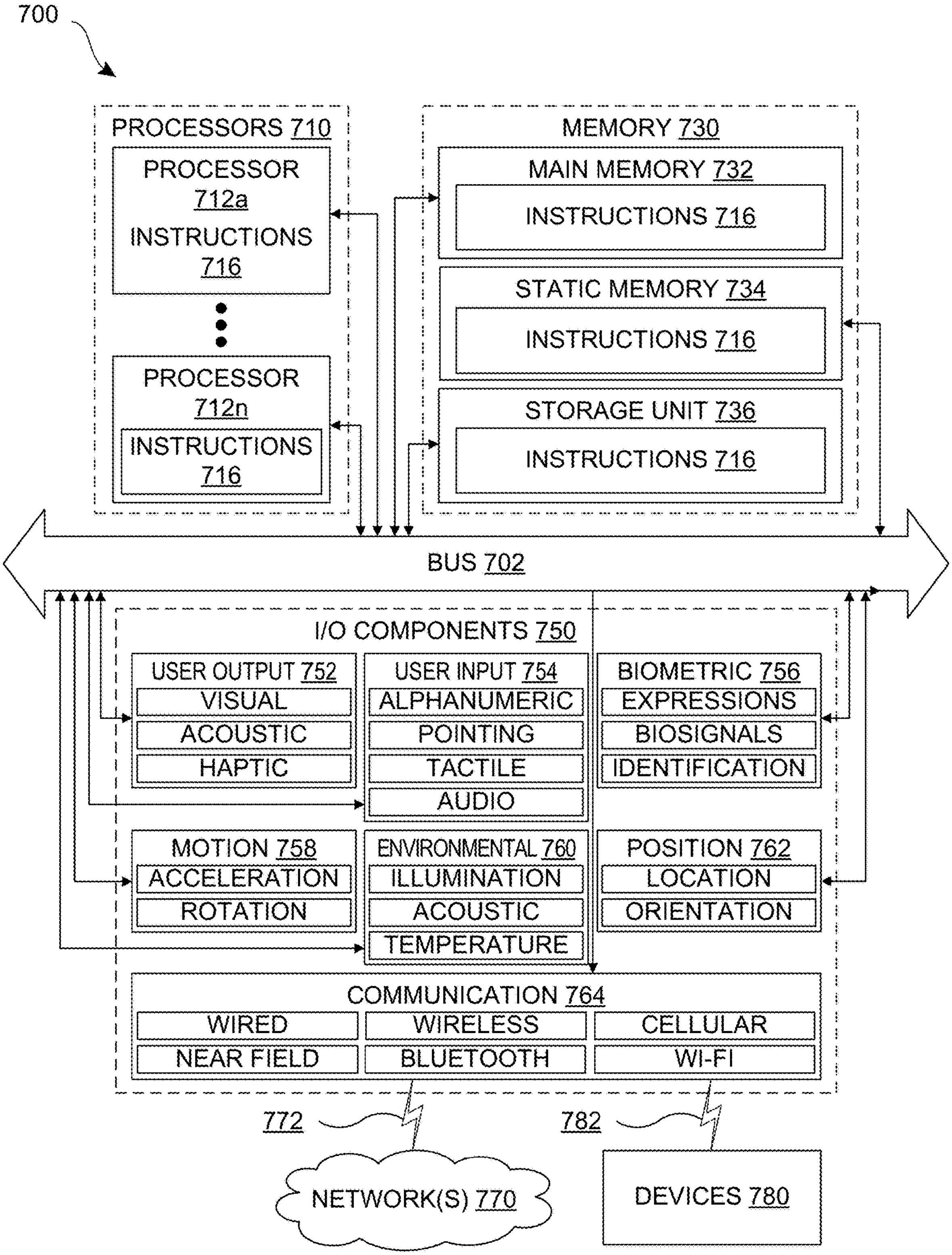
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IOT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712*a* to 712*n* that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764 such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:

a processor; and a memory in communication with the processor, the memory comprising executable instructions that, when executed by the processor alone or in combination with other processors, cause the data processing system to perform functions of:

receiving a product help inquiry provided via a user interface element of an application;

generating a prompt, using a prompt generating engine, based on the product help inquiry for transmission as an input to a language model;

retrieving a response provided to the user query by the language model;

extracting an action path included in the response based on a context of the response, the action path comprising a sequence of terms included in the response, each term referring to an action for performing one or more tasks associated with the product help inquiry;

generating contextual embeddings for one or more terms of the extracted action path, the contextual embeddings taking a context of the product help inquiry into account;

measuring a semantic similarity between the contextual embeddings for the extracted action path and embeddings generated for an expected response action path associated with the product help inquiry;

measuring a path coverage metric for the extracted action path; and determining a total evaluation value for the extracted action path based on a weighted combination of one or more of the measured semantic similarity, path coverage metric, a path length metric or a path frequency metric.

Item 2. The data processing system of item 1, wherein the instructions when executed by the processor the processor alone or in combination with other processors, cause the data processing system to perform functions of:

processing the product help inquiry, via one or more classifiers, to determine that the product help inquiry is associated with a product, and upon determining that the product help inquiry is associated with the product, identifying a product help documentation related to the product help inquiry.

Item 3. The data processing system of item 2, wherein the expected response action path is extracted from the identified product help documentation.

Item 4. The data processing system of item 2, wherein the product help documentation is identified by examining a product knowledge dataset associated with the product.

Item 5. The data processing system of any preceding item, wherein the instructions, when executed by the processor alone or in combination with other processors further cause the data processing system to perform functions of:

comparing the path coverage metric to a threshold value to determine whether the path coverage parameters meets the threshold value; and upon determining that the path coverage parameter does not meet the threshold value, identifying the response as being inaccurate.

Item 6. The data processing system of item 5, wherein the instructions when executed by the processor alone or in combination with other processors, further cause the data processing system to perform functions of upon identifying the response as being inaccurate, providing a notification to the application that a response to the product help inquiry cannot be provided.

Item 7. The data processing system of any preceding item, wherein contextual embeddings are a type of word representation that captures a meaning of a term based on its context within the response.

Item 8. The data processing system of any preceding item, wherein the total evaluation value is used to determine whether a relevance of the response to the product help inquiry.

Item 9. The data processing system of any preceding item, wherein the language model is a large language model.

Item 10. The data processing system of any preceding item, wherein the path coverage metric is compared to a threshold value to determine a level of accuracy for the response.

Item 11. A method for automatically evaluating performance of a model used in providing a response to a product help inquiry comprising:

receiving the product help inquiry;

classifying the product help inquiry as being associated with a topic related to a product via a classifier;

retrieving a path of actions provided in a help documentation associated with the topic;

providing a prompt generated, via a prompt generating engine, based on the product help inquiry for transmission to the model as an input;

receiving a response provided by the model as an output;

extracting a path of actions included the response the path of actions comprising a sequence of terms that refer actions included in the response for performing one or more tasks in the application;

generating contextual embeddings for the terms in the extracted path of actions, each contextual embedding being a word representation that captures a meaning of each term within a context of the product help inquiry;

measuring a semantic similarity between the contextual embeddings for the extracted path of actions and embeddings generated for the path of actions provided in the help documentation;

measuring a path coverage metric for the extracted path of actions; and determining a total evaluation value for the extracted path of actions based on a weighted combination of one or more of the measured semantic similarity, path coverage metric, a path length metric or a path frequency metric.

Item 12. The method of item 11, wherein capturing the meaning of each term within the context of the product help inquiry includes giving more weight to terms that are associated with the product help inquiry.

Item 13. The method of any of items 11 or 12, further comprising providing the response and the total evaluation value for finetuning the model.

Item 14. The method of any of items 11-13, further comprising:

determining that the total evaluation value does not meet a threshold evaluation value, and upon determining that the total evaluation value does not meet the threshold evaluation value, providing a notification that the response cannot be provided.

Item 15. The method of any of items 11-14, further comprising measuring the path coverage metric by comparing a number of actions in the extracted path of actions with a number of actions in the path of actions provided in the help documentation.

Item 16. The method of any of items 11-15, wherein the path length metric is measured by giving a higher value to a shorter path.

Item 17. The method of any of items 11-16, wherein the path frequency metric measures a frequency of occurrence of one or more actions in the extracted path in help documentations associated with the product.

Item 18. A non-transitory computer readable medium on which are stored instructions that, when executed, cause a programmable device to perform functions of:

extracting an action path included in a response provided by a model to a product help inquiry, the action path comprising a sequence of terms included in the response, each term referring to an action for performing one or more tasks associated with the product help inquiry;

measuring a semantic similarity between the extracted action path and an expected response action path for the product help inquiry by comparing contextual embeddings for the extracted action path with embeddings for the expected response action path;

measuring a path coverage metric for the extracted action path based on the expected response action path; and assigning one or more weights to the semantic similarity and the path coverage metric, and one or more of a path length metric and path frequency metric; and combining two or more of the weighted semantic similarity, weighted path coverage metric, weighted path length metric and weighted path frequency metric to generate a total evaluation value for the response.

Item 19. The non-transitory computer readable medium of item 18, wherein instructions when executed, further cause the programmable device to perform functions of comparing the path coverage metric to a threshold value to determine a level of accuracy of the response.

Item 20. The non-transitory computer readable medium of any of items 18 or 19, wherein the total evaluation value is used to finetune the model.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by “a” or “an” does not, without further constraints, preclude the existence of additional identical elements in the process, method, article, or apparatus that comprises the element. Furthermore, subsequent limitations referring back to “said element” or “the element” performing certain functions signifies that “said element” or “the element” alone or in combination with additional identical elements in the process, method, article or apparatus are capable of performing all of the recited functions.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites.

Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a memory in communication with the processor, the memory comprising executable instructions that, when executed by the processor alone or in combination with other processors, cause the data processing system to perform functions of:

receiving a product help inquiry provided via a user interface element of an application;

generating, using a prompt generating engine, a prompt for transmission as an input to a language model, wherein the prompt is based on the product help inquiry;

retrieving a response provided by the language model in response to the product help inquiry;

extracting an action path included in the response based on a context of the response, wherein the action path comprises a sequenced subset of terms extracted from the response, wherein each term in the action path refers to an action for performing one or more tasks associated with the product help inquiry, and wherein extracting the action path comprises using source code or resource files associated with the application to identify one or more commands or user interface elements referenced in the response;

generating contextual embeddings for one or more terms of the action path based on a context of the product help inquiry, wherein the contextual embeddings are generated only for terms in the action path to reduce computational resources required for generating the contextual embeddings;

measuring a semantic similarity between the contextual embeddings for the action path and contextual embeddings generated for an expected response action path associated with the product help inquiry, wherein the contextual embeddings for the expected response action path are generated by extracting one or more actions from help documentation, and wherein the semantic similarity is measured using cosine similarity;

calculating a path coverage metric for the action path;

determining a total evaluation value for the action path based on the semantic similarity and the path coverage metric;

determining, based on the path coverage metric, whether the path coverage metric exceeds a threshold value;

in response to determining that the path coverage metric exceeds the threshold value, providing the response to the product help inquiry via the application; and optimizing the performance of the language model by finetuning the language model based on the total evaluation value.

2. The data processing system of claim 1, wherein the instructions, when executed by the processor alone or in combination with other processors, further cause the data processing system to perform functions of:

processing the product help inquiry, via one or more classifiers, to determine that the product help inquiry is associated with a product, and upon determining that the product help inquiry is associated with the product, identifying the help documentation related to the product help inquiry for use in generating the expected response action path.

3. The data processing system of claim 2, wherein the help documentation is identified by examining a product knowledge dataset associated with the product.

4. The data processing system of claim 1, wherein the instructions, when executed by the processor alone or in combination with other processors, further cause the data processing system to, in response to determining that the path coverage metric does not exceed the threshold value, provide a notification to the application that the response to the product help inquiry cannot be provided.

5. The data processing system of claim 1, wherein the contextual embeddings are a type of word representation that captures a meaning of a term based on its context within the response.

6. The data processing system of claim 1, wherein the language model is a large language model.

7. A method for automatically evaluating performance of a language model used in providing a response to a product help inquiry, the method comprising:

receiving the product help inquiry provided via a user interface element of an application;

generating, using a prompt generating engine, a prompt for transmission as an input to a language model, wherein the prompt is based on the product help inquiry;

retrieving a response provided by the language model in response to the product help inquiry;

extracting an action path included in the response based on a context of the response, wherein the action path comprises a sequenced subset of terms extracted from the response, wherein each term in the action path refers to an action for performing one or more tasks associated with the product help inquiry, and wherein extracting the action path comprises using source code or resource files associated with the application to identify one or more commands or user interface elements referenced in the response;

generating contextual embeddings for one or more terms of the action path based on a context of the product help inquiry, wherein the contextual embeddings are generated only for terms in the action path to reduce computational resources required for generating the contextual embeddings;

measuring a semantic similarity between the contextual embeddings for the action path and contextual embeddings generated for an expected response action path associated with the product help inquiry, wherein the contextual embeddings for the expected response action path are generated by extracting one or more actions from help documentation, and wherein the semantic similarity is measured using cosine similarity;

calculating a path coverage metric for the action path;

determining a total evaluation value for the action path based on the semantic similarity and the path coverage metric;

determining, based on the path coverage metric, whether the path coverage metric exceeds a threshold value;

in response to determining that the path coverage metric exceeds the threshold value, providing the response to the product help inquiry via the application; and optimizing the performance of the language model by finetuning the language model based on the total evaluation value.

8. The method of claim 7, wherein generating the contextual embeddings comprises giving greater weight to phrases that are specific to a product for which help is being sought.

9. The method of claim 7, further comprising calculating the path coverage metric by comparing a number of actions in the action path with a number of actions in the expected response action path to determine a number of overlapping actions.

10. The method of claim 7, further comprising: in response to determining that the path coverage metric does not exceed the threshold value, providing a notification to the application that the response to the product help inquiry cannot be provided.

11. The method of claim 7, wherein determining the total evaluation value for the action path is further based on one or more of a path length metric and a path frequency metric.

12. The method of claim 11, wherein the path length metric is measured by giving a higher value to a shorter path.

13. The method of claim 11, wherein the path frequency metric measures a frequency of occurrence of one or more actions in the action path in the help documentation associated with a product.

14. A non-transitory computer readable medium on which are stored instructions that, when executed, cause a programmable device to perform functions of:

receiving a product help inquiry provided via a user interface element of an application;

generating, using a prompt generating engine, a prompt for transmission as an input to a language model, wherein the prompt is based on the product help inquiry;

retrieving a response provided by the language model in response to the product help inquiry;

extracting an action path included in the response based on a context of the response, wherein the action path comprises a sequenced subset of terms extracted from the response, wherein each term in the action path refers to an action for performing one or more tasks associated with the product help inquiry, and wherein extracting the action path comprises using source code or resource files associated with the application to identify one or more commands or user interface elements referenced in the response;

generating contextual embeddings for one or more terms of the action path based on a context of the product help inquiry, wherein the contextual embeddings are generated only for terms in the action path to reduce computational resources required for generating the contextual embeddings;

measuring a semantic similarity between the contextual embeddings for the action path and contextual embeddings generated for an expected response action path associated with the product help inquiry, wherein the contextual embeddings for the expected response action path are generated by extracting one or more actions from help documentation, and wherein the semantic similarity is measured using cosine similarity;

calculating a path coverage metric for the action path;

determining a total evaluation value for the action path based on the semantic similarity and the path coverage metric;

determining, based on the path coverage metric, whether the path coverage metric exceeds a threshold value;

in response to determining that the path coverage metric exceeds the threshold value, providing the response to the product help inquiry via the application; and optimizing the performance of the language model by finetuning the language model based on the total evaluation value.

15. The non-transitory computer readable medium of claim 14, wherein the contextual embeddings are a type of word representation that captures a meaning of a term based on its context within the response.

16. The non-transitory computer readable medium of claim 14, wherein the language model is a large language model.

* * * * *